(12) United States Patent
Kwak

(10) Patent No.: US 11,081,110 B2
(45) Date of Patent: Aug. 3, 2021

(54) DIALOGUE PROCESSING SYSTEM USING SPEECH ACT CONTROL AND OPERATION METHOD THEREOF

(71) Applicant: IIR TECH INC., Daejeon (KR)

(72) Inventor: Yong Jin Kwak, Daejeon (KR)

(73) Assignee: IIR TECH INC., Daejeon (KR)

( * ) Notice: Subject to any disclaimer, the term of this patent is extended or adjusted under 35 U.S.C. 154(b) by 0 days.

(21) Appl. No.: 16/765,162

(22) PCT Filed: Nov. 21, 2018

(86) PCT No.: PCT/KR2018/014309
§ 371 (c)(1),
(2) Date: May 18, 2020

(87) PCT Pub. No.: WO2019/103441
PCT Pub. Date: May 31, 2019

(65) Prior Publication Data
US 2020/0380993 A1 Dec. 3, 2020

(30) Foreign Application Priority Data
Nov. 22, 2017 (KR) .................. 10-2017-0156647

(51) Int. Cl.
*G10L 15/22* (2006.01)
*G10L 15/26* (2006.01)
*G10L 15/34* (2013.01)
*G06F 16/332* (2019.01)

(52) U.S. Cl.
CPC .......... *G10L 15/22* (2013.01); *G06F 16/3329* (2019.01); *G10L 15/26* (2013.01); *G10L 15/34* (2013.01); *G10L 2015/228* (2013.01)

(58) Field of Classification Search
None
See application file for complete search history.

(56) References Cited

U.S. PATENT DOCUMENTS

| 2014/0250195 A1* | 9/2014 | Capper | H04L 51/02 |
| | | | 709/206 |
| 2018/0196796 A1* | 7/2018 | Wu | G06F 40/289 |
| 2018/0322880 A1* | 11/2018 | Vuskovic | G10L 15/1815 |

FOREIGN PATENT DOCUMENTS

| JP | 2007-041443 A | 2/2007 |
| KR | 10-2000-0037625 A | 7/2000 |
| KR | 10-2010-0111164 A | 10/2010 |

(Continued)

OTHER PUBLICATIONS

International Search Report of PCT/KR2018/014309 published on May 31, 2019.

*Primary Examiner* — Antim G Shah

(57) ABSTRACT

Disclosed is a dialogue processing system using speech act control, the dialogue processing system comprising: a main speech act unit which processes a free speech act and performs speech act control such that the free speech act returns to a main speech act, thereby processing a multi-turn dialogue in a consistent manner, and which processes a purposed utterance having a set purpose, for reaching a final dialogue objective; and a free speech act unit which processes a free utterance deviating from the purposed utterance and performs control such that the free utterance returns to the main speech act unit by searching for a node capable of returning to the purposed utterance.

6 Claims, 8 Drawing Sheets

(56) References Cited

FOREIGN PATENT DOCUMENTS

| | | | |
|---|---|---|---|
| KR | 10-1178310 | B1 | 8/2012 |
| KR | 10-1309042 | B1 | 9/2013 |
| KR | 10-1565143 | B1 | 11/2015 |
| KR | 10-2017-0086215 | A | 7/2017 |
| WO | 2017189559 | A1 | 11/2017 |

\* cited by examiner

DIALOGUE PROCESSING SYSTEM USING SPEECH ACT CONTROL AND OPERATION METHOD THEREOF

CROSS REFERENCE TO RELATED APPLICATIONS

This application is a national entry application of International Application No. PCT/KR2018/014309 filed on Nov. 21, 2018, which claims priority to Korean Application No. 10-2017-0156647 filed on Nov. 22, 2017, the entire contents of which are herein incorporated by reference in its entirety.

TECHNICAL FIELD

The present disclosure relates to a dialogue processing system using speech act control and an operation method thereof, and more particularly, to a technique for processing a purpose-oriented multi-turn dialogue by using speech act control.

TECHNICAL BACKGROUND

The technology of computer and human communication using Natural Language Processing (NLP) is widely known as a term "chatbot". Chatbot is the output of human natural language as a means of response using rules, frames, and machine learning, wherein the computer's processing and user's input occur alternately, and the chatbot processes the multi-turn dialogues, and induces them to reach the final dialogue objective.

Korean Granted Patent No. 10-1178310 discloses a dialogue management method and a system executing the same, and Korean Patent Laid-Open Publication No. 10-2017-0086215 discloses a dialogue knowledge extraction server, method, and dialogue providing device. Conventionally, a main speech act corresponding to a purposed utterance is processed through a main speech act control means including a scenario or a Finite State Transition (FST). Purposed utterance refers to an utterance with a set purpose.

However, conventionally, there is a problem in that a natural conversation does not occur, due to responding with the wrong answer in response to a user's input utterance or by repeating the same response. In addition, until now, the role of the chatbot has been limited to responding to user inquiries or utterances, making it difficult to implement it as a means for achieving objectives through dialogue.

DETAILED DESCRIPTION

Problems to be Solved

In order to solve the above problems, the present disclosure performs speech act control to return to the main speech act while processing free speech act of free utterance upon receiving an input of free utterance.

SUMMARY OF INVENTION

A dialogue processing system using speech act control according to the present disclosure for achieving the above-mentioned object includes, a main speech act unit which processes a purposed utterance having a set purpose, and a free speech act unit which processes a free utterance deviating from a purposed utterance and performs speech act control to return to the main speech act unit by searching for a node capable of returning to a purposed utterance, wherein the free speech act unit performs control to return to the main speech act unit while processing a free utterance.

The main speech act unit may include, a first main speech act unit which processes a purposed utterance of a multi-turn, and a second main speech act unit which identifies whether or not the purposed utterance is deviated and if a deviation of a purposed utterance occurs, changes authority to the speech act control of the free speech act unit.

The second main speech act unit may check whether or not an utterance of a user is deviated from a purposed utterance and may change authority to the speech act control of the free speech act unit when an utterance of a user is determined as a free utterance.

The free speech act unit may include a first free speech act unit which processes a free utterance of a multi-turn, and a second free speech act unit which searches for a node capable of returning to the main speech act to generate one or more return inducing paths.

The first free speech act unit may process a free utterance of a multi-turn via a chatbot pool consisting of one or more chatbots or a dialogue flow graph and may classify each free speech act to select a chatbot or a response utterance.

The second free speech act unit may search for a returnable node, and may backtrack nodes that are connectable from a returnable node to a current response utterance, to generate a return inducing path.

The first free speech act unit may search for a response utterance corresponding to a last output in which a topic movement or a topic deviation from the main speech act unit occurs, and compares an utterance of a response utterance candidate with a return induction path or a response utterance candidate with a common node.

An operation method of a dialogue processing system using speech act control according to the present disclosure, including the steps of: processing a purposed utterance having a set purpose, and processing a free utterance deviating from a purposed utterance and performing speech act control to return to a main speech act unit by searching for a node capable of returning to a purposed utterance, wherein the return to the main speech act unit is induced via control of the free speech act unit.

Advantages of Invention

According to the present disclosure, it is possible to consistently process a multi-turn dialogue and reach a final dialogue objective by performing speech act control to return to a main speech act while processing a free speech act.

EMBODIMENTS

Hereinafter, embodiments of the present disclosure will be described in detail with reference to the accompanying drawings and the contents described in the accompanying drawings, but the present disclosure is not limited by the embodiments.

The term "speech act" generally refers to acts through utterances, and includes interactions a speaker attempts to draw from a listener through utterances. For this reason, linguistically, a "speech act" refers to the entire conversation and action between a speaker and a listener, but in engineering/science fields such as natural language processing, there is a tendency for a "speech act" to be interpreted as what a speaker wants to require from or deliver to a listener, that is, it is often interpreted as an "intent".

The term "dialogue flow" refers to a concept similar to stories, topics, and scenarios, focusing on the contents of dialogue between participants during a conversation. In other words, the dialogue flow should not be understood as an intent, but more closely refers to a correlation between preceding utterances and the current utterance.

In the present disclosure, the term "speech act" can be understood by its linguistic definition, in which the definition of a dialogue flow can be incorporated thereto.

Figure 1:
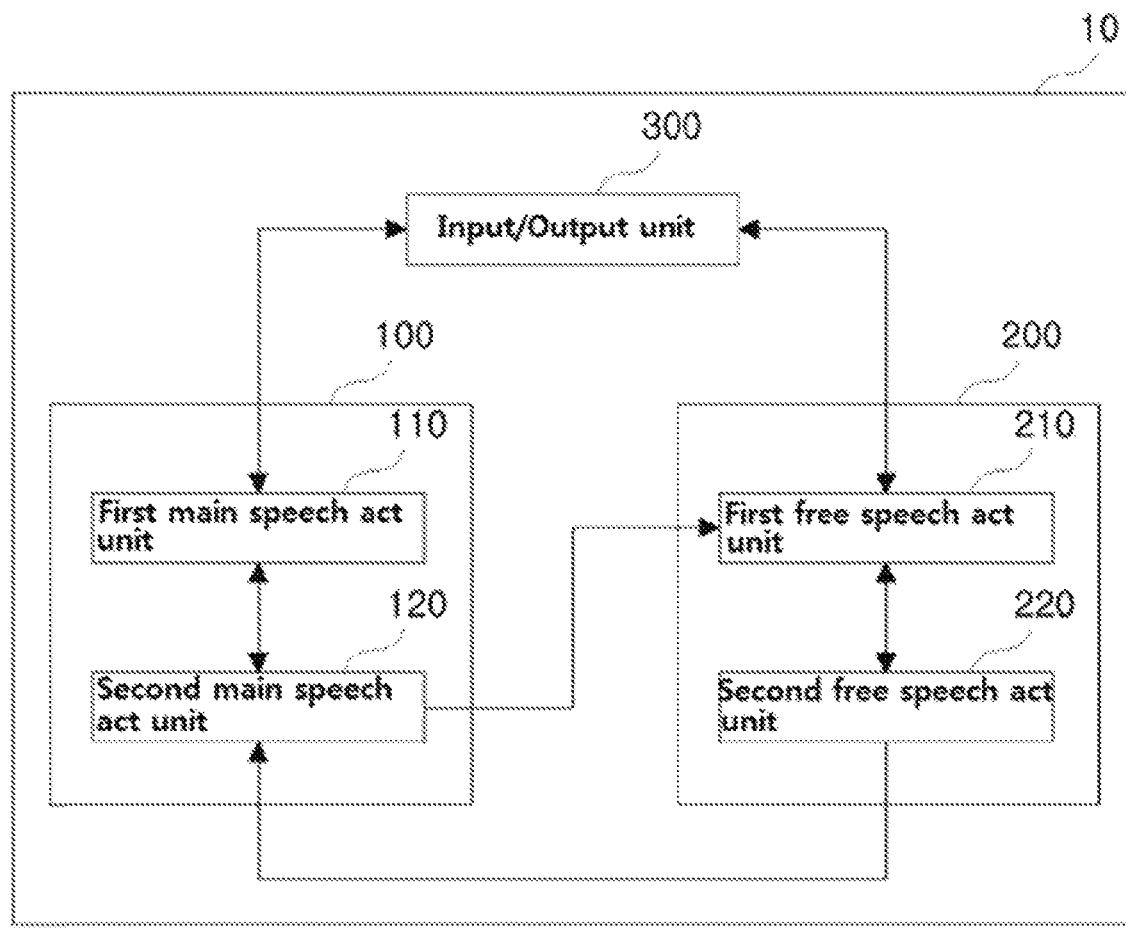
FIG. 1 is a block diagram illustrating a dialogue processing system using speech act control according to the present disclosure.

FIG. 1 is a block diagram illustrating a dialogue processing system using speech act control according to the present disclosure, wherein a dialogue processing system 10 includes a main speech act unit 100 which processes a main speech act of a purposed utterance, and a free speech act unit 200 which processes a free speech act of a free utterance.

A purposed utterance is an utterance with a set purpose such as education, guidance, marketing, and so on, and is a purpose-oriented utterance. A free utterance is an utterance that deviates from a purposed utterance, and are unexpected utterances of a user or an utterance of a topic different from the set purpose. For example, a free utterance may be an utterance with a topic or an utterance without a topic, or may be a free utterance of a user.

The purposed utterance is determined by the characteristics of an application or domain developed using the present disclosure. Free speech act does not have an application or domain-dependent purpose, unlike purposed utterance.

The main speech act unit 100 processes a purposed utterance to reach a final dialogue objective with a scenario consisting of a set purpose, and the free speech act unit 200 processes the free speech deviated from the purposed utterance. The free speech act unit 200 processes free utterances to continue a conversation with a user in response to a topic deviating from the set purpose. The processing of purposed utterance is processing the main speech act, and the processing of free utterance refers to processing the free speech act.

The set purpose may be an educational purpose, a guide purpose, or a marketing purpose, and may be set for various purposes according to a system design or application field, but is not limited thereto. An educational purpose may be a purpose related to foreign language learning, dementia diagnosis, learning for evaluating linguistic abilities, or other various learning for each subject. A guide purpose may be a purpose related to reservation services for a hotel, restaurant or plane tickets, a call center counseling service, or introducing services for travel, food or specific places. A marketing purpose may be a purpose related to introducing products, inducing purchase, sales promotion, or advertisement.

The final dialogue objective refers to the outcome to be achieved through dialogue, such as teaming and explanation, and refers to proceeding from the beginning to the end of a series of scenarios. For example, in the case of a dialogue processing system for educational applications, the final dialogue objective refers to a dialogue proceeding from the beginning of learning to the end of learning such as, from 'Hello. Today, class will be about 00' to 'That's all for this class. Good job.' In addition, in the case of a dialogue processing system of a marketing application, the final dialogue objective refers to starting with a product description and proceeding to a product purchase.

Figure 2:
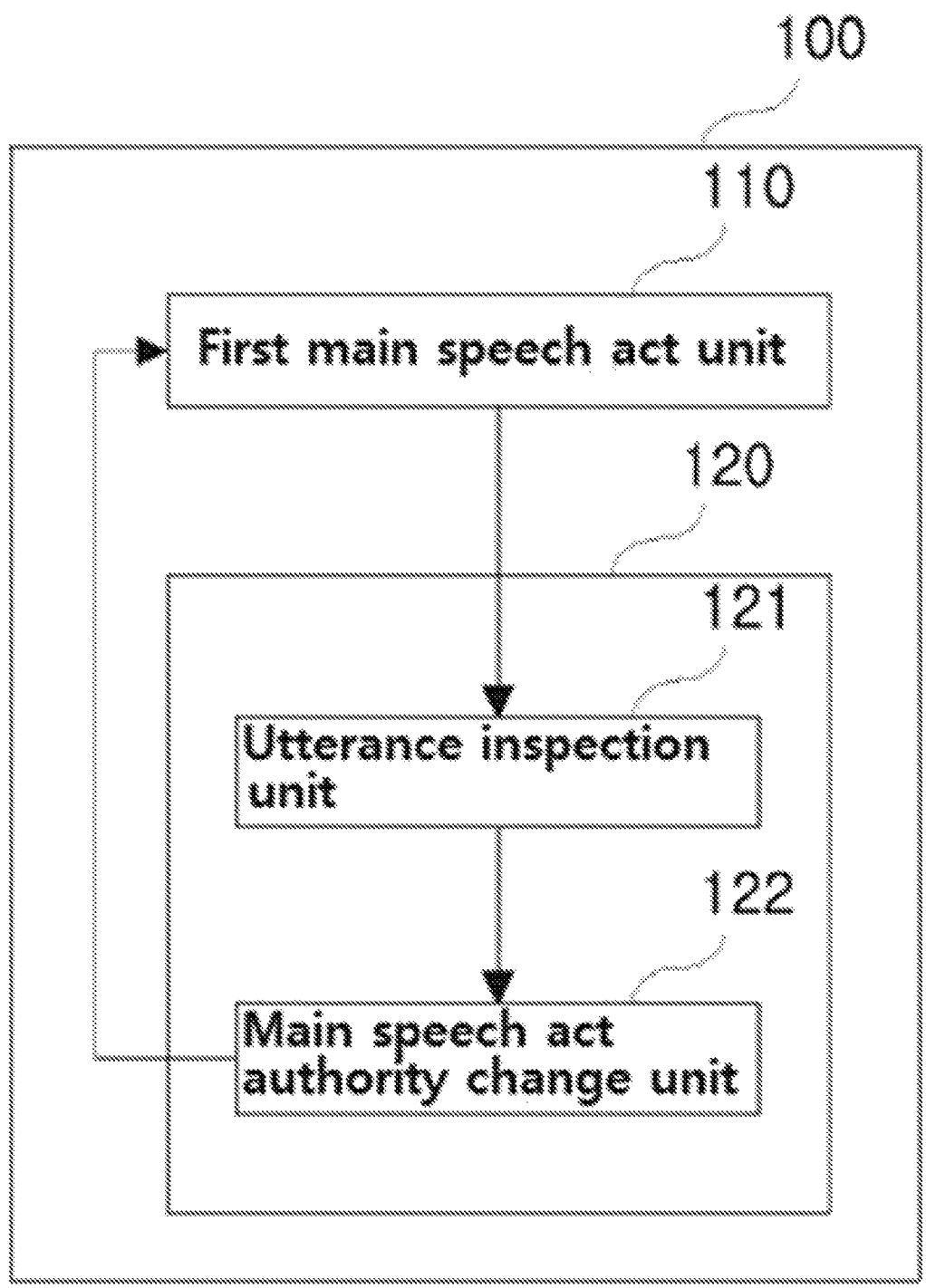
FIG. 2 is a block diagram illustrating in detail the main speech act unit of FIG. 1.

FIG. 2 is a block diagram illustrating in detail the main speech act unit of FIG. 1, and the main speech act unit 100 includes a first main speech act unit 110 and a second main speech act unit 120.

The first main speech act unit 110 processes a main speech act corresponding to a purposed utterance via a main speech act control means including a scenario or a Finite State Transition (FST).

The first main speech act unit 110 recognizes the utterance intention of a user, performs optimal response utterance, and processes the main speech act of the purposed utterance to reach the final dialogue objective such as the end of learning, end of guiding, and product purchase. For example, the first main speech act unit 110 generates an utterance in response to the utterance of a user when the utterance of the user is in accordance with the main speech act.

The second main speech act unit 100 includes an utterance inspection unit 121 and a main speech act authority change unit 122.

The utterance inspection unit 121 extracts the main speech act and identifies whether or not the dialogue objective has been reached. When the dialogue objective is reached, the first main speech act unit 110 ends the main speech act process of the current dialogue, and when the dialogue objective is not reached, the speech act for the next dialogue is processed in order to lead to the dialogue objective while maintaining the current dialogue.

The utterance inspection unit 121 checks whether or not the main speech act is deviated, by checking whether the utterance of a user has deviated from the main speech act, and if a deviation of the main speech act occurs, the main speech act authority change unit 122 changes authority to the speech act control of the free speech act unit 200.

The first main speech act unit 110 registers the characteristics of vocabulary and phrase sets such as [Place], [Go|Move|Travel], [NOT Question] in an evaluation reference value of an input utterance or expected utterance when the chatbot utterance is output, and a response utterance or a predetermined utterance for an expected utterance can be calculated before user input.

The utterance inspection unit 121 may compare an evaluation reference value of an expected utterance corresponding to a user's input and summary information of a predetermined utterance to evaluate whether or not the purposed utterance is deviated in a discrete and linear manner. The summary information may be information related to a processing plan or an action plan for linguistic analysis values and a system. The example below illustrates an example in which a predetermined utterance according to an expected utterance is output.

<Example of Predetermined Utterance Output According to Expected Utterance>
Chatbot: Where did you travel recently?
User: I've been busy recently.
<Expected Utterance> I went to ∘∘∘.
<Predetermined Utterance 1> Where was the most impressive place in ∘∘∘?
<Predetermined Speech n> What was the most enjoyable thing in ∘∘∘?

Conventionally, the main speech act matching the purposed utterance was processed using a transition probability model such as FST or a scenario method. For example, in the prior art, the one having the highest correlation among the previous utterance and response utterance candidate of the user is selected.

The present disclosure not only uses the user's previous utterance, but also first determines whether or not the main speech act that matches the purposed utterance is deviated, including the expected utterance and the predetermined utterance of the chatbot, and selects the next optimal utterance when conforming to the speech act, so in comparison to the prior arts, there are differences. For example, the present disclosure determines whether or not there is deviation from a main speech act that matches the purposed utterance, including the current utterance, expected utterance, and predetermined utterance of a chatbot and user utterance, and selects the one having the highest correlation among candidate groups for the response utterance.

Figure 3:
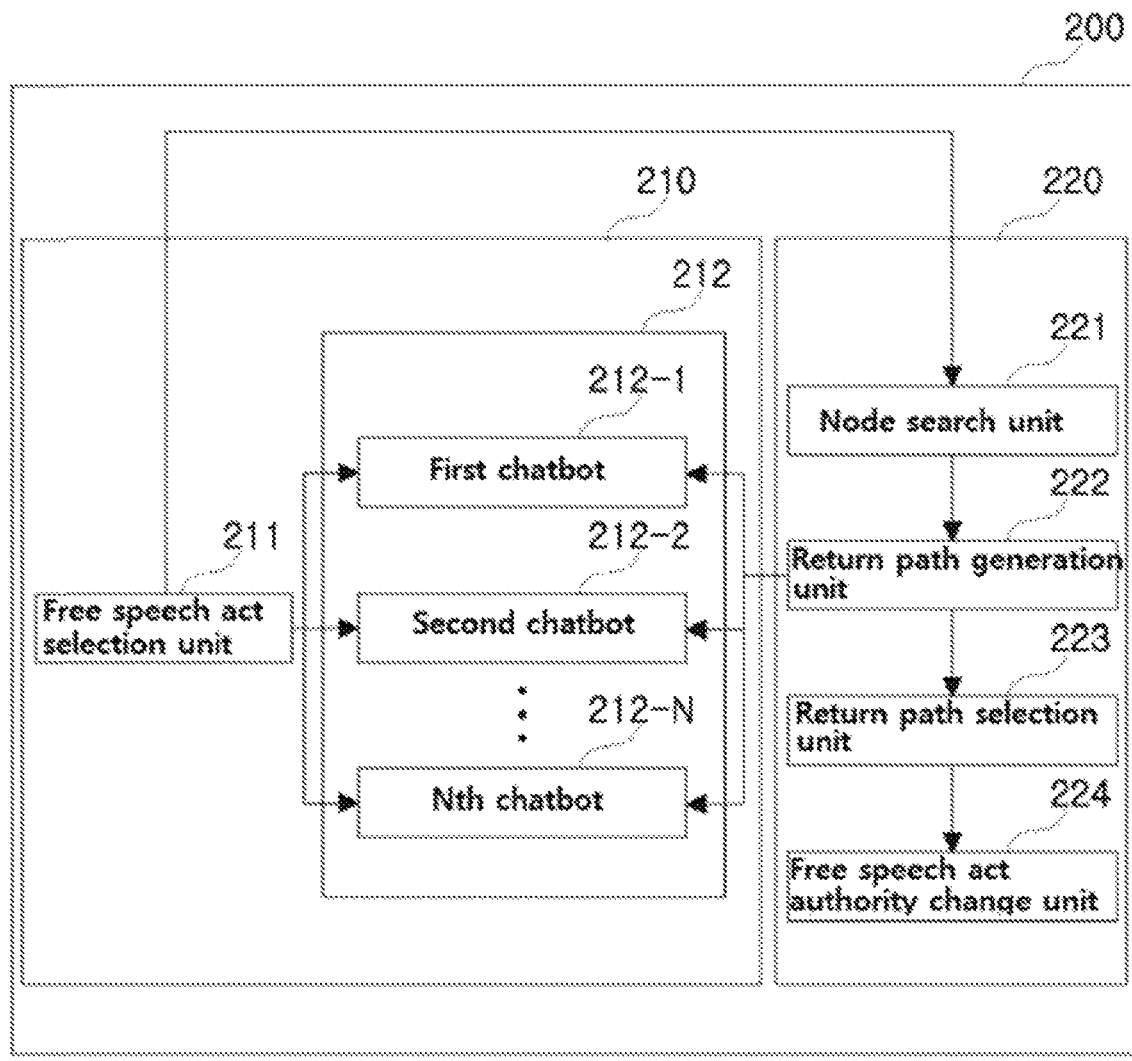
FIG. 3 is a block diagram illustrating in detail the free speech act unit of FIG. 1.

FIG. 3 is a block diagram illustrating in detail the free speech act unit of FIG. 1, and the free speech act unit 200 processes free utterances deviated from the purposed utterance when deviation of the purposed utterance occurs, and searches for returnable nodes for returning to the main speech act unit 100. The free speech act unit 200 may process a free speech act matching a free utterance corresponding to an exceptional user reaction.

The free speech act unit 200 analyzes the user utterance and returns the response utterance that best matches the user's intention when the deviation of the purposed utterance occurs, but by searching for a returnable node that can be connected to feedback of a purposed utterance to select the optimal response utterance through the search for returnable nodes that can be connected, the speech act control is performed such that the free speech act is processed while returning to the main speech act unit 100. More particularly, the free speech act unit 200 proceeds with free utterance to induce feedback from a user that matches a scenario or expected utterance consisting of a set purpose for achieving the final dialogue objective.

The free speech act unit 200 includes a first free speech act unit 210 which processes a free speech act of a multi-turn and a second free speech act unit 220 which searches for a node capable of returning to the main speech act to generate a return node.

The first free speech act unit 210 is classified into a free speech act processing unit 212 in which a free speech act of a multi-turn is processed via a chatbot pool consisting of one or more chatbots 212-1, 212-2, . . . 212-N, and a free speech act selection unit 211 which classifies each free speech act and selects a chatbot or a response utterance. The chatbot pool is a free utterance model that can process free speech acts of topics different from main speech acts in order to continuously induce a conversation with a user.

The first free speech act unit 210 may process a free speech act of a multi-turn via a Dialogue Flow Graph (DFG).

In free utterance, the use's topic movement may occur frequently, as illustrated in the example below, and there is a problem in that it is difficult to maintain a long conversation consistently via a single chatbot.

<Examples of Free Utterances in which Topic Movement Occurs Frequently>
[Travel Topic] Chatbot: Where did you travel recently?
User: I've been busy recently.
[Action topic] Chatbot: Why were you busy?
User: I think of my parents a lot these days.
[Regards Topic] Chatbot: Contact your parents often.
User: If I get paid for my part-time job, I should buy a new cell phone.

The present disclosure consists of a plurality of chatbots in charge of short dialogues consisting of 3 to 5 turn levels, and even if frequent topic movements and topic deviations by the user occur, inappropriate responses to the dialogue flow can be minimized by allowing the selection of the optimal chatbot in charge at the time of user input. For example, the 3 turn level is the level in the order of chatbot-user-chatbot.

The free speech act selection unit 211 receives a request for changing the speech act control authority from the main speech act authority change unit 122 to the speech act control of the free speech act unit 200, and a chatbot can be selected for processing a free speech act matching the user's free utterance.

The free speech act selection unit 211 may receive the last output of the chatbot in which a speech act deviation from the second main speech act unit 100 has occurred, the user's last input for this, and the next scenario of the main speech act. The next scenario of the main speech act is the user's expected utterance and response utterance.

The second free speech act unit 220 receives a return requirement when a chatbot is selected for each free speech act for the return to the main speech act from the free speech act selection unit 211.

The optimal utterance selection in the chatbot pool or dialogue flow graph is the same as the optimal utterance selection in general chatbots, except for the correlation with the returnable node to main speech act. However, for a general chatbot, it is classified by each subject and situation within an expected response utterance group such as a scenario or script, and the user input is analyzed to select the optimal utterance. In the chatbot pool, a user utterance is transferred to a waiting chatbot, the output utterance of the chatbot can be seen, and a chatbot can be selected for optimal utterance.

The second free speech act unit 220 includes a node search unit 221, a return path generation unit 222, a return path selection unit 223, and a free speech act authority change unit 224.

The node search unit 221 searches for a node capable of returning to the main speech act, and the return path generation unit 222 generates a return inducing path by backtracking connectable nodes from a returnable node to a current response utterance, and the free speech act authority change unit 224 changes the speech act control authority to the speech act control of the main speech act unit 100.

The free speech act processing unit 212 calculates a common node or a recent intersection node between a first path generated from the current response utterance and a second path generated from the utterance of the returnable node.

The example below illustrates an example according to a user's expected utterance and actual utterance.

<Example According to User's Expected Utterance and Actual Utterance>

Chatbot: Where did you travel recently?
Expected Utterance: I went to (Destination).
Actual Utterance: I've been busy recently.
[Transfer to Free Speech Act Selection Unit 211 Deviated From Main Speech Act]
Purposed Utterance: (Destination) has a lot of delicious food.

In the above utterance example, "I've been busy recently." is classified as a deviation from the main speech act and is transferred to the free speech act selection unit 211.

The node search unit 221 finds the sentence most similar to the purposed utterance. "(Destination) has a lot of delicious food." among various chatbot pools, and here, "ooo has a lot to eat, right?" among the dialogue nodes in the travel chatbot pool at the last part of the arrow is most similar, so this can be determined as a returnable node.

A dialogue pair with the same pattern as the chatbot's response to "I've been busy", "That must be hard." may appear as a duplicate among a plurality of chatbot pools, but considering that the content where there is delicious food in the destination can be a returnable node, the candidate group will be reduced.

<Example of Dialogue Pairs that Appeared in the Movie Chatbot Pool>

Bot: Have you seen a movie recently?→User: I was busy.→Bot: That must be hard.

When the returnable node is determined, the return path generation unit 222 forms a return inducing path such as an expected dialogue scenario in the reverse order.

The method of forming the return inducing path goes back in the reverse order of the graph from the returnable node "ooo has a lot to eat, right?", and this can be said to be the opposite when considering that the general dialogue prediction methods are sequential. That is, rather than predicting the answer of "ooo has a lot to eat, right?," after seeing, "I heard ooo is great," on the contrary, it is a method where the utterance most likely to trigger the response "ooo has a lot to eat, right?" is predicted. Tracking back in such reverse order, the branching point of a node is encountered, for example, it can be understood that "I heard ooo is great" and "Yes, I can't go anywhere" is branching from that node.

The return path generation unit 222 may generate a utterance path sequentially using the dialogue prediction method with the starting point as the current response utterance, "That must be difficult."

The return path generation unit 222 may generate utterance paths for a plurality of return inductions for one main speech act deviation dialogue. For example, the return path generation unit 222 may cause an utterance path generated through the return inducing path generation method in the reverse order based on a returnable node, and secondly, cause an utterance path generated sequentially through the dialogue prediction method with the current response utterance of a free speech act controller as a starting point. In addition, the return path generation unit 222 may cause an utterance path to be generated by a return inducing path generation method due to a dialogue prediction method, a return inducing path generation method, or a cause of a branch diverging due to a branching node. The following example is an example of generating a plurality of utterance paths.

<Example of Generating a Plurality of Utterance Paths>

1. ooo has a lot to eat. [Returnable Node t]→I heard ooo is great [t−1]→Where do you want to go? [t−2]→Yes, I can't go anywhere [t−3]→That must be hard. [t−4]

2. That must be hard. [Response Node t for Input Deviated from Main Speech Act]→Yes. I can't go anywhere. [Branchable Node t+1]→Then go to ooo next time. [t+2]

3. That must be hard. [Response Node t for Input Deviated from Main Speech Act]→Yes. I can't go anywhere. [Branchable Node t+1]→Where do you want to go? [t+2]→I heard ooo is great ... [Branchable Node t+3]→There's a lot to see in ooo, right? [t+4]

4. That must be hard. [Response Node t for Input Deviated from Main Speech Act]→Yes. I can't go anywhere. [Branchable Node t+1]→Where do you want to go? [t+2]→I heard ooo is great ... [Branchable Node t+3]→ooo has a lot to eat, right? [t+4]

Since the return path selection unit 223 generates a plurality of utterance paths as in the example above, an optimal path algorithm is used to ultimately select the utterance path having a short total path of a proceeding node such as having the lowest total sum of 1-similarity values of each node and the smallest number of nodes, and wherein the utterance path through the dialogue prediction method and the utterance path through the return inducing method has the most identical nodes. At this time, the range of similarity x in the 1-similarity value is 0 or more and 1 or less.

The return path selection unit 223 measures the correlation with response utterance candidate group of the current free speech act processing unit 212 with respect to the search result of the node immediately before optimal return, so that when it is greater than the correlation with the previous node immediately before the optimal return with respect to the current node immediately preceding the optimal return, the return-start optimal path, such as the nodes immediately before the optimal return up till now, is selected.

The response utterance of the free speech act processing unit 212 according to the user's next input may have a lower correlation with the returnable node, so the return path selection unit 223 repeats searches for the return-start optimal path whenever a user input occurs.

When the main speech act authority change unit 122 receives a request for changing the speech act control authority from the free speech act authority change unit 224 to the speech act control of the main speech act unit 100, the first main speech act unit 110 is controlled to operate again.

The present disclosure can reduce additional scenarios, such as the user's sudden utterances, exceptional utterances, or extended knowledge, by processing the main speech act that matches the purposed utterance.

In the present disclosure, when the deviation of the main speech act occurs, the authority to generate a response utterance corresponding to the user utterance is changed to the free speech act unit 200, thereby, the main speech act unit 100 avoids an unexpected user's utterance, and generation of an inappropriate response utterance can be prevented.

The present disclosure can prevent the conversation from being interrupted through the free speech act unit 200 even if the user enters an utterance deviating from a topic or an unexpected utterance, and prevents an erroneous response utterance from being output in response to the user utterance.

The dialogue processing system 10 using the speech act control of the present disclosure may further include an input/output unit 100 which receives a user's voice or text-type utterance and outputs a response utterance corresponding to the user utterance.

Figure 4:
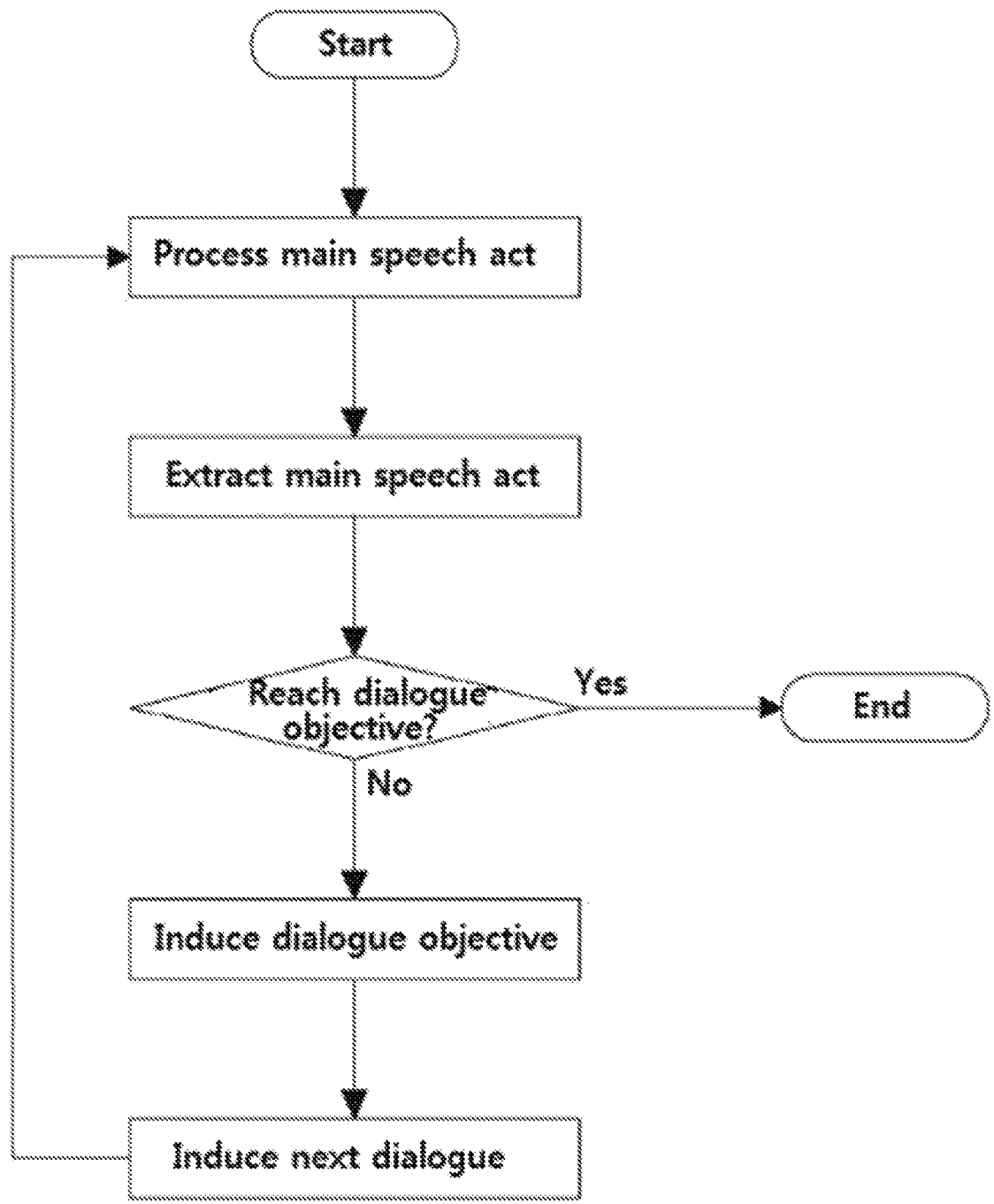
FIG. 4 is a flow chart illustrating an operation method of the main speech act unit in FIG. 1.

FIG. 4 is a flow chart illustrating an operation method of the main speech act unit in FIG. 1, and assuming there is no deviation of the main speech act, the main speech act unit 100 processes the main speech act of the purposed utterance and extracts the main speech act to identify whether or not the dialogue objective is reached. When the dialogue objective is reached, the main speech act unit 100 ends the processing of the main speech act dialogue of the current dialogue, and when the dialogue objective is not reached, processes the speech act for the next dialogue in order to lead to the dialogue objective while maintaining the current dialogue.

Figure 5:
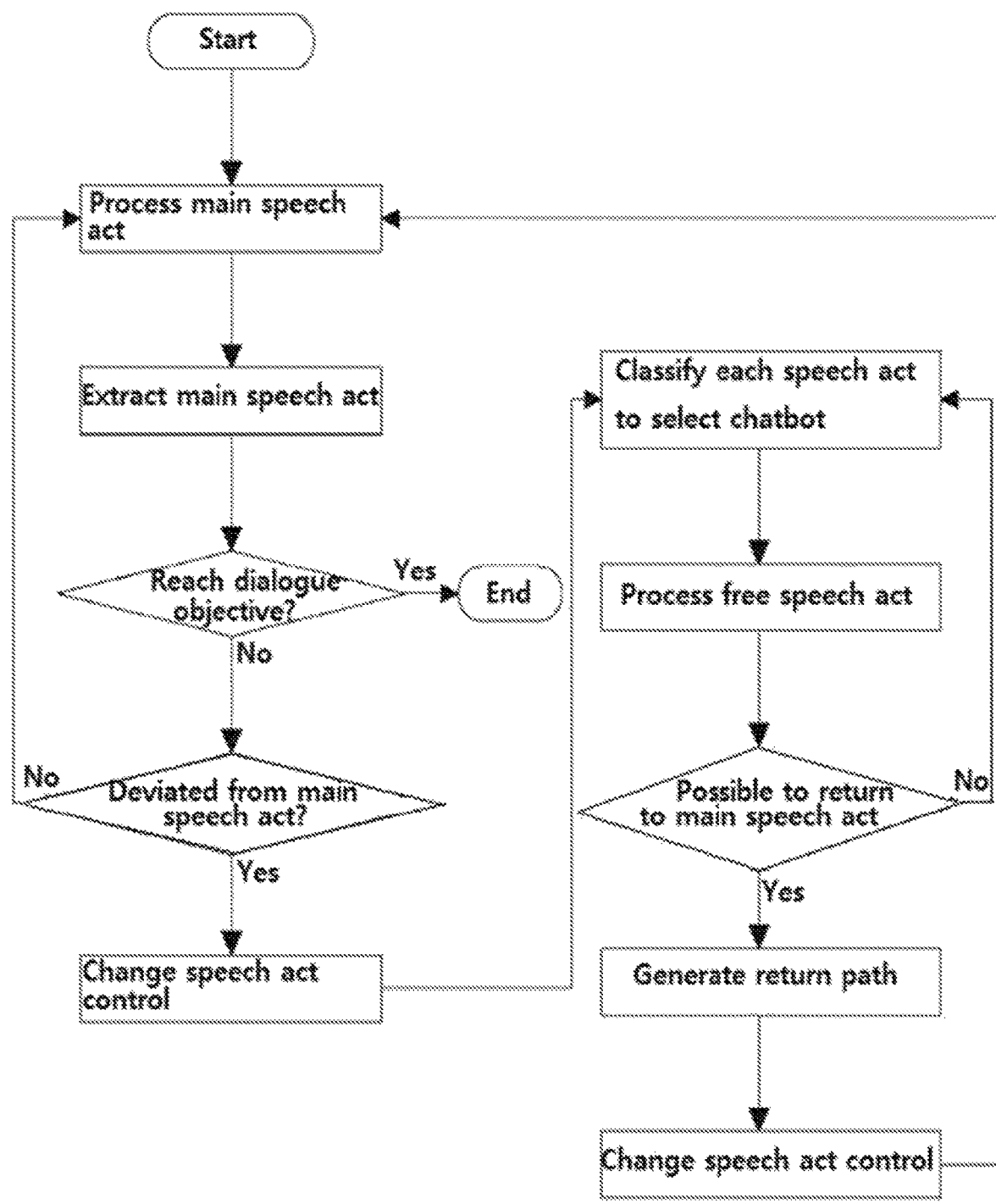
FIG. 5 is a flowchart illustrating an associated operation method of the main speech act unit and the free speech act unit in FIG. 1.

FIG. 5 is a flowchart illustrating an associated operation method of the main speech act unit and the free speech act unit in FIG. 1, and the main speech act unit 100 identifies whether or not the main speech act is deviated, and if the deviation of the main speech act occurs, the for speech act control authority is changed to the speech act control of the free speech act unit 200.

When the request for changing the speech act control authority is received from the main speech act unit 100, the free speech act unit 200 processes the free speech act of free utterance and searches for possible nodes for returning to the main speech act.

The free speech act unit 200 searches for a node capable of returning to the main speech act, and backtracks the connectable nodes from the returnable node to the current response utterance to generate a return inducing path, and transmits a request to the main speech action part 200 for changing the speech act control authority to the speech act control of the main speech act unit 100.

When one or more path deviations occur where a common node is absent, a deviation occurs after entering a common node, and a free speech act changes, the free speech act unit 200 searches a returnable node again, and continues to process the free speech act.

Figure 6:
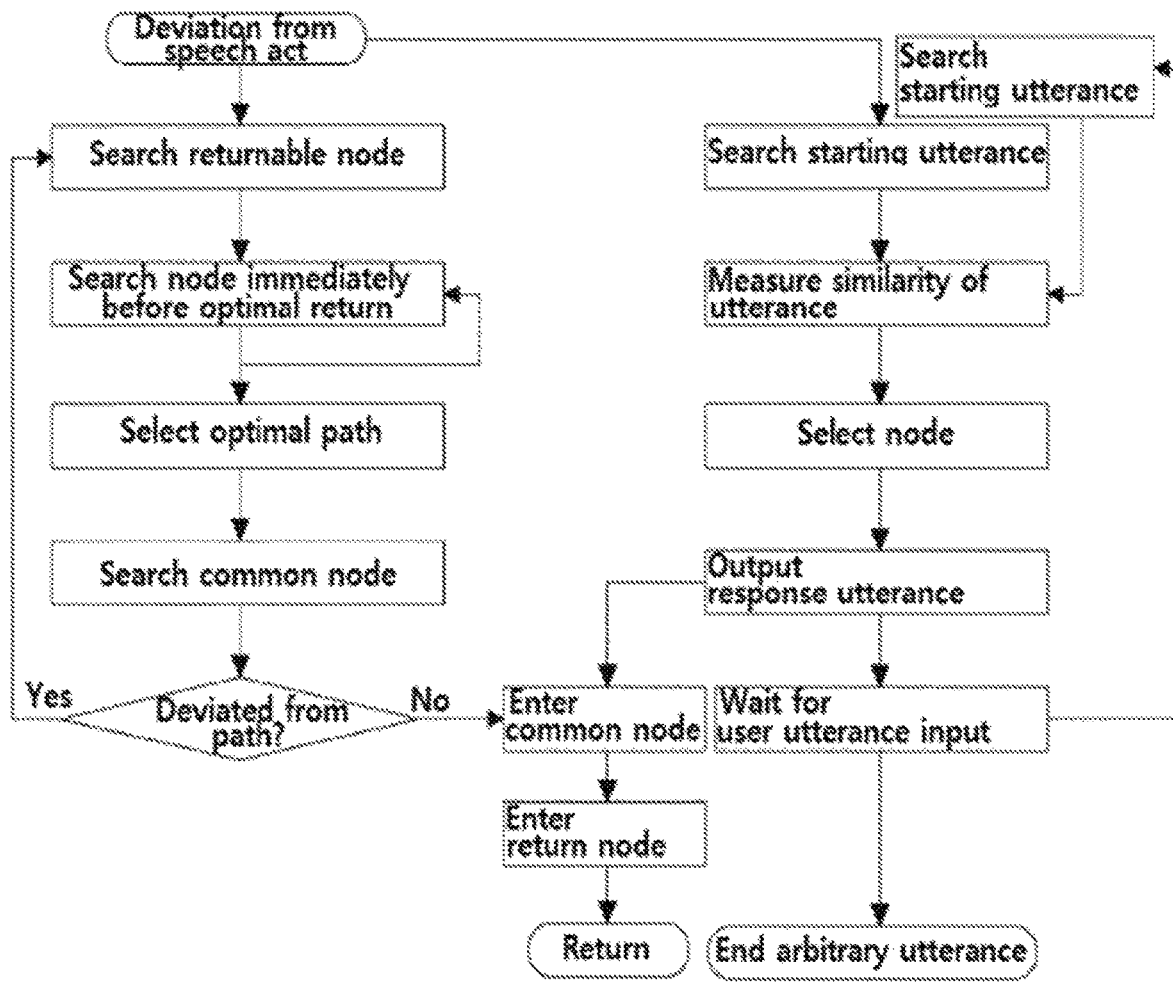
FIG. 6 is a flowchart illustrating an operation method of the first free speech act unit and the second free speech act unit when the main speech act is deviated.

FIG. 6 is a flowchart illustrating an operation method of the first free speech act unit and the second free speech act unit when the main speech act is deviated, and the node search unit 221 searches for returnable nodes based on the last output where a speech act deviation occurred in the first main speech act unit 110 from the free speech act selection unit 211, the last input of a user corresponding to the last output, and the next scenario of the main speech act corresponding to the last input of the user.

The return path generation unit 222 generates a return inducing path by backtracking connectable nodes from the returnable node to the current response utterance.

The present disclosure maintains a dialogue in response to the user utterance even when the main speech act is deviated, and if the utterance similar to the expected utterance to be performed immediately before or immediately after the main speech act deviation is output as feedback, it is possible to allow natural utterance to take place even if the dialogue is proceeded according to the main speech act again.

The free speech act processing unit 212 searches for the most natural response utterance candidate according to the last output of the speech act deviation from the first main speech act unit 110 and the user's last input corresponding to the last output.

The free speech act processing unit 212 measures the similarity of utterance by comparing the utterance of the response utterance candidate and the return node or the common node generated in the return path generation unit 222.

The free speech act processing unit 212 compares the utterance of the return node or the common node to determine the response utterance.

The return node may have a different path from the current response utterance and the utterance of the returnable node. The free speech act processing unit 212 may increase the effect of inducing an utterance by calculating a common node or a recent intersection node between the first path generated from the current response utterance and the second path generated from the utterance of the returnable node.

Since the correlation between a returnable node and a response utterance candidate generated in the free speech act processing unit 212 may be very low, and a guarantee rate that a response utterance candidate can be connected to a returnable node may be low, so the return path generation unit 222 searches for returnable nodes that can increase the correlation with the response utterance candidates.

The return path generation unit 222 generates a return inducing path by backtracking nodes connectable from the returnable node to the current response utterance.

Figure 7:
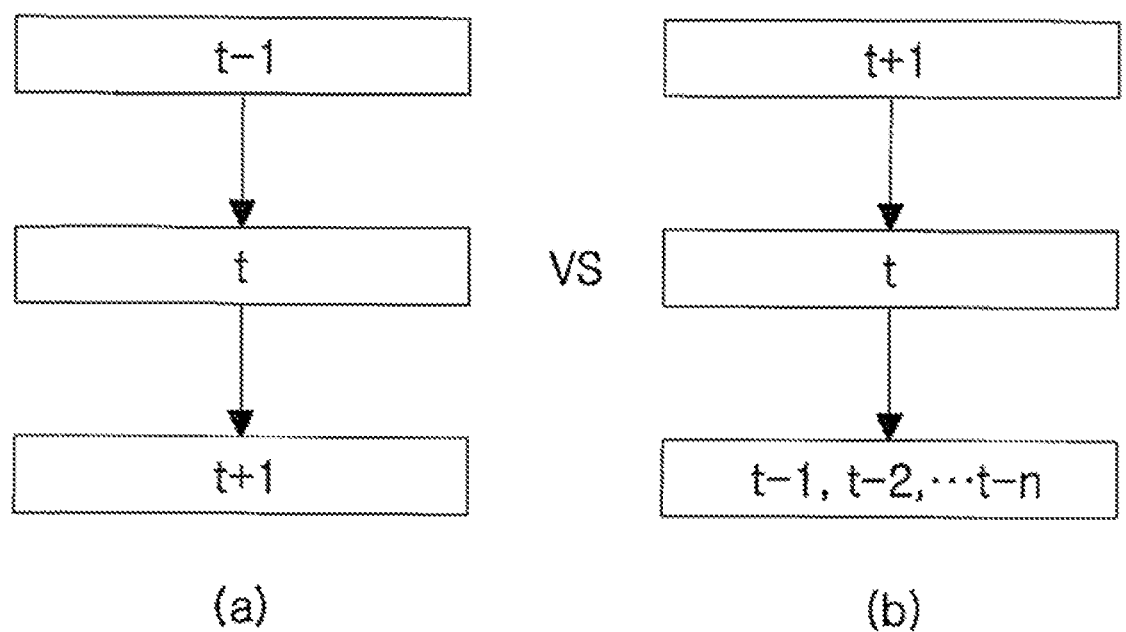
FIG. 7 is an example of comparing a conventional dialogue prediction method and a method of generating a return path of the present disclosure.

FIG. 7 is an example of comparing a conventional dialogue prediction method and a method of generating a return path of the present disclosure. In FIG. 7, (a) is a conventional dialogue prediction method and (b) is the method of generating a return path of the present disclosure.

The conventional dialogue prediction method is a method of searching and performing the most natural (t+1)th utterance when considering the (t−1)th utterance in respect to the tth utterance, and the method for generating the return node of the present disclosure is a method which is performed by searching for the (t−1)th utterance, the (t−2)th utterance, . . . and the (t−n)th utterance which is the optimal response of the tth utterance when the tth returnable utterance and (t+1)th speech act deviated utterance or predetermined utterance after returning is given.

More particularly, the conventional dialogue prediction method is a method of selecting an optimal response utterance or an optimal speech act having a high correlation at the next utterance time t+1 when the currently input user utterance is t, wherein Sen2Vec, etc. are representative, and is a method implemented by using deep learning techniques such as RNN.

The present disclosure is not simply a correlation with t, but is calculated by including, as a weight, a correlation of a returnable node's utterance or a common utterance. That is, the present disclosure is not simply a natural response relationship with t, but enables the selection of an utterance containing a possibility of being connected to a return node utterance as an optimal response.

The main speech act return inducing includes a function of setting the utterance of the returnable node to t, and selecting an utterance node at t−1 such that t is the optimal response utterance.

Referring back to FIG. 6, the return path selection unit 223 measures the correlation with the response utterance candidate groups of the current free speech processing unit 212 with respect to the search result of the node immediately before the optimal return, so that if the correlation is higher than that of the previous node immediately before the optimal return, the return-start optimal path, such as the nodes immediately before optimal return up till now, are selected. The return-start optimal path has a higher correlation with the current response utterance than the returnable node, and influences the response utterance to be selected in the direction in which the correlation with the returnable node increases.

The response utterance of the free speech act processing unit 212 according to the user's next input may have a lower correlation with the returnable node, so the node search unit 221 repeats searches for the return-start optimal path whenever a user input occurs.

The return path selection unit 223 searches for the common node and controls the speech act to return to the main speech act by entering the response utterance output from the free speech act processing unit 212 to the common node and the return node.

Figure 8:
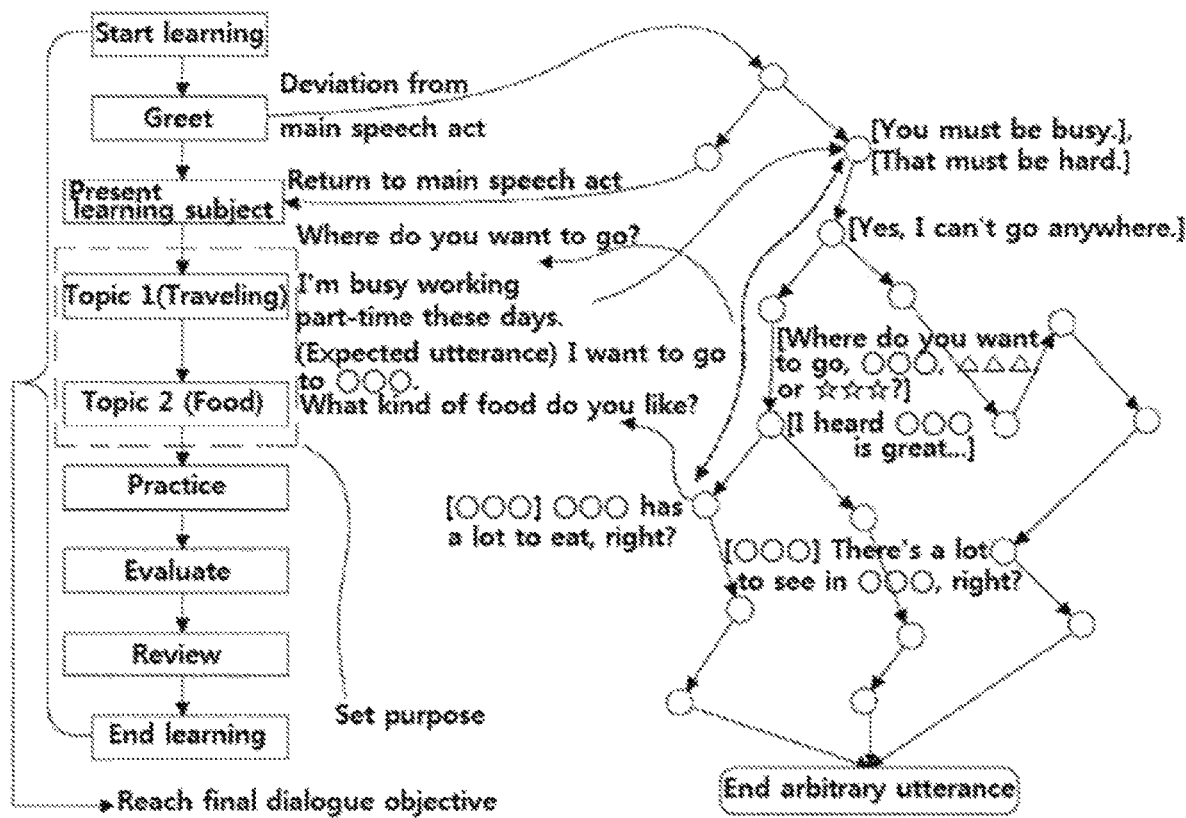
FIG. 8 is an example illustrating a process of returning to the main speech act.

FIG. 8 is an example illustrating the process of returning to the main speech act, and the present disclosure includes not only a free speech act processing unit 212 which calculates and searches for a response utterance corresponding to the free utterance of a user to process various topics and speech acts, but also includes a return path generation unit 222 which measures the similarity with a returnable node or a common node in order to induce an utterance that can return to the main speech act upon selection, so it is possible to output a response feedback that is highly likely to lead the user's utterance to an utterance of the main speech act return node.

The return path generation unit 222 may search for an expected utterance from a dialogue before deviating from the main speech act, and continuously search for the utterances having the highest correlation that causes the expected utterance, to form a return node.

The return node may have a different path generated from the current response utterance and the path from the return node. The free speech act processing unit 212 may increase an utterance inducing effect by calculating a common node or a recent intersection node between the first path generated from the current response utterance and the second path generated from the utterance of the returnable node.

The main speech act return inducing includes a function of setting the utterance of the returnable node to t, and selecting the utterance node at t−1 such that t is the optimal response utterance. For example, if t is "Where do you want to go other than ooo?", t−1 is selected from "I want to go to ooo in time.", "My friends went to ooo." and so on. At this time, a correlation with the current output predetermined utterance of the free speech act processing unit 212 may be included as a weight. In this way, t−1, t−2, . . . tn is repeated until the current output utterance or the previous utterance is absent or a limited number of times to generate a return-inducing utterance path.

The node search unit 221 searches again and regenerates when a path deviates, such as the absence of a common node in a free speech act, a deviation after entering a common node, or a change in a free speech act.

The process of returning to the main speech act will be described in detail with reference to the example of FIG. 8. The free speech act unit 200 may connect and process a sentence without a topic with a sentence in which a topic exists, or connect and process different sentences with different topics, or connect and process sentences with similar topics with each other.

A sentence without a topic or one of the sentences with a mutually different topic is a user utterance sentence, and a sentence with a topic or the other sentence with the mutually different topic is a sentence for the return path of the main speech act. Further, a sentence with a similar topic is a sentence for a user utterance or a sentence for the return path of the main speech act. The free speech act unit 200 may connect a sentence of the user utterance and a sentence for the return path of the main speech act. The sentence for the return path of the main speech act may be each sentence entering each node of the return path.

The dialogue processing system 10 sets a topic so that a purposed utterance may be processed in the main speech act unit 100. As shown in FIG. 8, in the main speech act unit 100, Topic 1 is a travel topic, 'Where do you want to go?', and Topic 2 is a food topic, 'What kind of food do you like?'

First, the user's utterance does not make an expected utterance in response to the travel topic, 'Where do you want to go?', and a topic deviation may occur with a business topic, 'I'm busy working part-time these days'.

Next, the free speech act unit 200 determines a returnable node in order to return to the topic of the main speech act in response to the user's utterance like, 'That must be hard', and in the reverse order, forms a return inducing path such as an expected dialogue scenario. In more detail, the free speech act unit 200 forms a return inducing path such as an expected scenario in reverse order such as, a sentence for the return path of the main speech act such as, 'ooo has a lot to eat, right?'→'Where do you want to go, ooo, ΔΔΔ, . . . or ☆☆☆?'→'That must be hard.'

Here, the user utterance 'Yes, I can't go anywhere' may be a sentence without a topic, or it may be a sentence related to a business topic interpreted as being unable to go anywhere due to a busy part-time job. Also, the sentence, 'Where do you want to go, ooo, ΔΔΔ, . . . or ☆☆☆?' which enters each node in the return path is a sentence in which a topic exists or the other sentence of the mutually different topics.

Here, the user's utterance saying that 'I heard ooo is great' is a sentence of a topic related to ooo, such as a sentence similar to the topic of the next response utterance of 'ooo has a lot to eat, right?'

The free speech act unit 200 determines a returnable node for returning to the topic of the main speech act and, by forming a return inducing path such as an expected dialogue scenario in reverse order, it is possible to connect a sentence without a topic with a sentence in which the topic exists, sentences with mutually different topics, or sentences with mutually similar topics, to generate a sentence which enters each node of the return path.

A sentence without a topic may be the user's unexpected utterance. The free speech act unit 200 can output a response utterance even if a sentence without a topic that is the user's unexpected utterance comes out, and it is possible to generate a sentence which enters each node of the return path by backtracking the connectable nodes from the returnable node to the current response utterance.

The free speech act unit 200 finds a list if nodes that can be placed between the most appropriate utterance for the user utterance and the returnable node that is the utterance having the highest correlation with the next speech act of the main speech act, when speech act of the main speech act is deviated from the dialogue collection, which is an arbitrary chatbot pool.

According to the present disclosure, by controlling the speech act to return to the main speech act while processing the free speech act, it is possible to consistently process multi-turn dialogues, reach the final dialogue objective, and the dialogue with the user can be continued until the final dialogue objective. For example, the present disclosure allows the user to maintain a dialogue even if the user makes a free utterance different from the purposed utterance, and induces a dialogue that can return to the main speech act to reach the final dialogue objective.

The present disclosure enables passive and active dialogue. In the present disclosure, in order to reach a dialogue purpose during active dialogue, a certain strategy and expected utterance is predicted to have a conversation, and the present disclosure focuses on maintaining a dialogue continuously through appropriate reaction or response to a user's utterance during passive dialogue, and at times, enables maintaining continuous dialogue until an appropriate time to change it into an active dialogue. Therefore, whereas the conventional chatbot focused on the appropriateness of the response to a user's utterance, the chatbot of the present disclosure can also be implemented with active dialogue. For example, if the conventional chatbot serves as an order receptionist in home shopping, the chatbot of the present disclosure can also serve as a salesperson or a show host.

INDUSTRIAL APPLICABILITY

The present disclosure can be used as a dialogue processing application with a set purpose such as education, guidance, or marketing, and can be used as a chatbot.

What is claimed is:

1. A dialogue processing system using speech act control, comprising:
 a main speech act unit which processes a purposed utterance having a set purpose, and
 a free speech act unit which (i) finds candidate return inducing paths which connect between the free utterance and the purposed utterance, and (ii) selects an optimal path among the candidate return inducing paths, and (iii) processes the free utterance using the optimal path,
  wherein the optimal path is determined by using (i) the number of nodes placed between the free utterance and the purposed utterance, (ii) similarity between the free utterance and the purposed utterance, (iii) correlation between the response utterance and the last node of the optimal path, or (iv) a combination thereof,
 wherein the main speech act unit comprises:
 a first main speech act unit which processes the purposed utterance, wherein the purposed utterance is a multi-turn, and
 a second main speech act unit which identifies whether or not the purposed utterance is deviated and, when a deviation of the purposed utterance occurs, changes authority of speech act control to the free speech act unit,
 wherein the second main speech act unit checks whether or not an utterance of a user is deviated from the purposed utterance and changes the authority of the speech act control to the free speech act unit when the utterance of the user is determined as the free utterance.

2. The system of claim 1,
 wherein the free utterance is a multi-turn.

3. The system of claim 2,
 wherein the first free speech act unit processes the free utterance via a chatbot pool consisting of one or more chatbots or a dialogue flow graph and classifies each free speech act to select a chatbot or a response utterance.

4. The system of claim 1,
 wherein the second free speech act unit searches for the return inducing paths by back-tracking nodes between the free utterance and the utterance.

5. The system of claim 4,
 wherein the first free speech act unit searches for a response utterance corresponding to a last output in which a topic movement or a topic deviation from the main speech act unit occurred.

6. An operation method of a dialogue processing system using speech act control, comprising the steps of:
 upon receipt of a purposed utterance having a set purpose, performing a main speech act,
 upon receipt of a free utterance deviating from the purposed utterance, performing a free speech act which includes,
 (i) finding candidate return inducing paths which connect between the free utterance and the purposed utterance,
 (ii) selecting an optimal path among the candidate return inducing path, and
 (iii) processing the free utterance using the optimal path,
 wherein the optimal path is determined by using (i) the number of nodes placed between the free utterance and the purposed utterance, (ii) similarity between the free utterance and the purposed utterance, (iii) correlation between the response utterance and the last node of the optimal path, or (iv) a combination thereof,
 wherein the step of performing the main speech act comprises:
 processing the purposed utterance, wherein the purposed utterance is a multi-turn, and
 identifying whether or not the purposed utterance is deviated and
 when a deviation of the purposed utterance occurs, changing authority of speech act control to perform the free speech act,
 wherein the step of identifying whether or not the purposed utterance is deviated includes: checking whether or not an utterance of a user is deviated from the purposed utterance and changing the authority of the speech act control to perform the free speech act unit when the utterance of the user is determined as the free utterance.

* * * * *